(No Model.)
W. H. PENNOCK.
CORN COVERER.
No. 291,396. Patented Jan. 1, 1884.
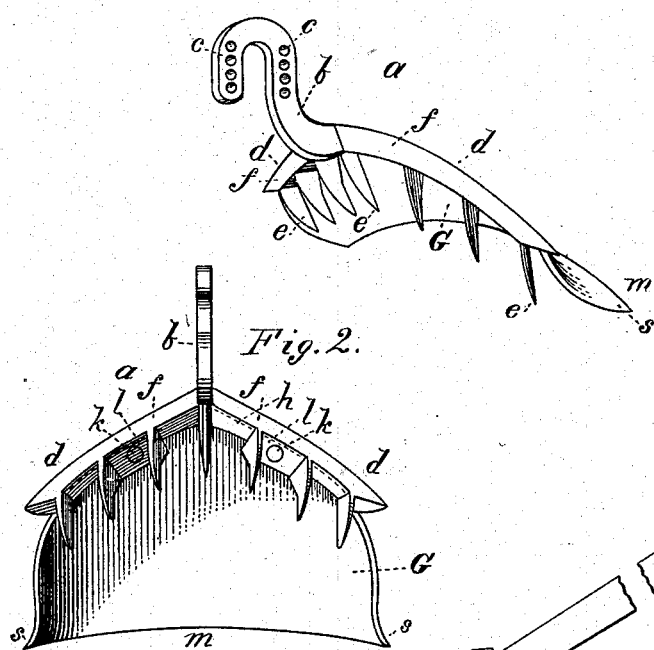
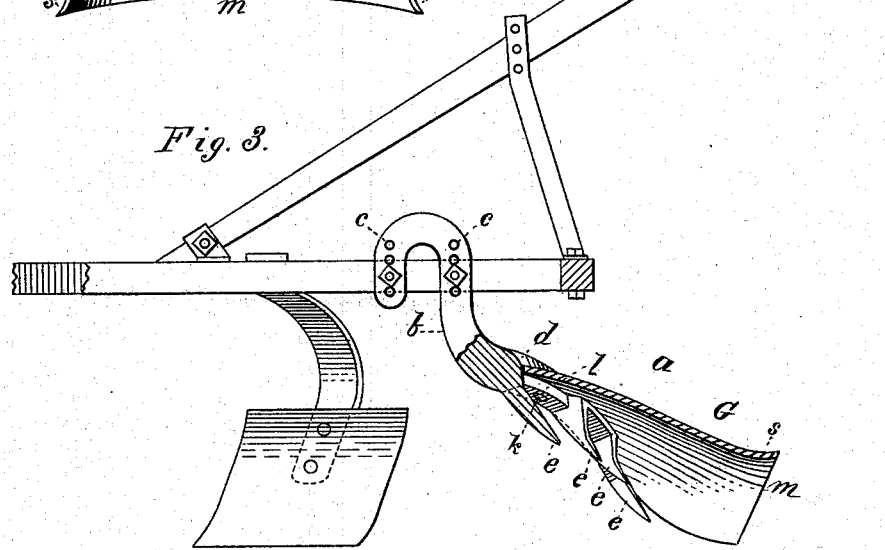
WITNESSES
Villette Anderson
John T. Morrow
INVENTOR
W. H. Pennock
by Anderson & Smith
his ATTORNEYS

UNITED STATES PATENT OFFICE.

WILLIAM H. PENNOCK, OF WILMINGTON, DELAWARE.

CORN-COVERER.

SPECIFICATION forming part of Letters Patent No. 291,396, dated January 1, 1884.

Application filed May 26, 1883. (No model.)

*To all whom it may concern:*

Be it known that I, W. H. PENNOCK, a citizen of the United States, residing at Wilmington, in the county of New Castle and State of Delaware, have invented certain new and useful Improvements in Corn-Coverers; and I do declare the following to be a full, clear, and exact description of the invention, such as will enable others skilled in the art to which it appertains to make and use the same, reference being had to the accompanying drawings, and to letters and figures of reference marked thereon, which form a part of this specification.

Figure 1 of the drawings is a representation of this invention, and is a perspective view. Fig. 2 is a view of the under side. Fig. 3 is a vertical section.

This invention has relation to rake-head attachments for cultivators; and it consists in the construction and novel arrangement of the arched rake, having its outwardly-extending arms inclined rearward and downward, and the arched downwardly and rearwardly inclined covering-plate secured to the arms of the rake, all as hereinafter set forth.

In the accompanying drawings, the letter $a$ designates the rake, having a curved shank, $b$, provided with series of perforations $c$, whereby it is adapted to engage attachment-bolts serving to connect it to a central bar or bars of the cultivator-frame. From the lower end of the shank the branches $d\ d$ of the rake extend outwardly, being inclined somewhat to the rear, and curved downward, so that the general form of the rake is that of a transverse arch, whereof the middle or higher portion is in advance of the outer portions. The teeth $e$ of the rake are flattened from side to side, having curved front edges, and are somewhat inclined rearward and downward, as are also the forward faces, $f$, of the rake-bar branches, from which they extend. The planes of the lateral teeth of the rake are directed, usually, somewhat inward and rearward, in order to draw the earth toward the center.

G indicates the arched rearwardly-inclined covering-plate, the upper and forward edge, $h$, of which is of angular form, to fit the angular span of the arms of the rake, to which it is secured by means of bolts or rivets $k$, passing through perforations in the plate and in lugs $l$ of the rake-arms. The lower and rear edge, $m$, of the plate G is transversely arched, its general position being about even with or a little lower than the points of the teeth. The rear portion of the plate next the edge $m$ is curved outwardly a little, forming a smoothing-lip, $s$.

This rake-head is designed to be attached to the cultivator when covering corn, potatoes, or seed of any kind, for the purpose of removing from the seed-bed clods, stones, sods, or other obstructions which would prevent the grain or seed from readily coming up. It is designed also to pulverize the soil and shape the seed-bed in smooth and even convex form. In this manner it is designed to finish the work at one operation, and to dispense with the use of the land-roller.

Having described this invention, what I claim, and desire to secure by Letters Patent, is—

1. A rake-head attachment for cultivators consisting of a transversely-arched rake and a transversely-arched rearwardly-inclined covering and smoothing plate secured thereto in rear, substantially as specified.

2. The rake-head consisting of the rake $a$, having the outwardly and rearwardly inclined and downwardly-arched branches $d$, and the transversely-arched and downwardly and rearwardly inclined covering-plate G, having the angular front edge, $h$, and the rear smoothing-lip, $s$, substantially as specified.

3. An adjustable rake-head attachment consisting of the transversely-arched rake $a$, having the curved and perforated shank $b$, and the transversely-arched and rearwardly and downwardly inclined covering and smoothing plate G, secured to perforated lugs of the rake, substantially as specified.

In testimony whereof I affix my signature in presence of two witnesses.

WILLIAM H. PENNOCK.

Witnesses:
EDGAR A. FINLEY,
GEO. C. WARD.